US010818249B2

(12) United States Patent
Nakajima

(10) Patent No.: US 10,818,249 B2
(45) Date of Patent: Oct. 27, 2020

(54) CONTROL DEVICE AND LIQUID CRYSTAL DISPLAY APPARATUS

(71) Applicant: JVC KENWOOD Corporation, Yokohama-shi, Kanagawa (JP)

(72) Inventor: Nobuki Nakajima, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/223,208

(22) Filed: Dec. 18, 2018

(65) Prior Publication Data

US 2019/0221172 A1 Jul. 18, 2019

(30) Foreign Application Priority Data

Jan. 12, 2018 (JP) ................. 2018-003682

(51) Int. Cl.
| | |
|---|---|
| G09G 5/10 | (2006.01) |
| G09G 3/36 | (2006.01) |
| G06T 15/50 | (2011.01) |
| G09G 3/00 | (2006.01) |
| G03B 33/12 | (2006.01) |
| G02F 1/1343 | (2006.01) |
| G09G 3/34 | (2006.01) |
| G02F 1/1335 | (2006.01) |
| G09G 3/20 | (2006.01) |

(52) U.S. Cl.
CPC ............. *G09G 3/36* (2013.01); *G09G 3/002* (2013.01); *G02F 1/13439* (2013.01); *G02F 1/133553* (2013.01); *G02F 1/134336* (2013.01); *G03B 33/12* (2013.01); *G09G 3/2022* (2013.01); *G09G 3/3413* (2013.01); *G09G 2320/0209* (2013.01); *G09G 2320/0266* (2013.01); *G09G 2320/064* (2013.01); *G09G 2320/0646* (2013.01); *G09G 2320/10* (2013.01)

(58) Field of Classification Search
None
See application file for complete search history.

(56) References Cited

U.S. PATENT DOCUMENTS

| | | | | |
|---|---|---|---|---|
| 2011/0310299 A1* | 12/2011 | Keller | ................... | G09G 3/342 348/563 |
| 2012/0127216 A1* | 5/2012 | Kimura | ................ | G09G 3/3651 345/690 |
| 2013/0063428 A1* | 3/2013 | Choi | ..................... | G09G 3/003 345/419 |

FOREIGN PATENT DOCUMENTS

JP          2010-032749          2/2010

* cited by examiner

*Primary Examiner* — Carl Adams
(74) *Attorney, Agent, or Firm* — Amin, Turocy & Watson, LLP

(57) ABSTRACT

A control device is a control device that controls, based on an image signal for display of an image for each frame period, driving of a liquid crystal display apparatus, and the control device includes: a period dividing unit that divides a frame period into a first period and a second period later than the first period; a signal calculating unit that calculates, based on the image signal, a first signal value and a second signal value for driving of a liquid crystal element of the liquid crystal display apparatus; and a liquid crystal driving unit that drives the liquid crystal element with the first signal value in the first period, and drives the liquid crystal element with the second signal value in the second period.

6 Claims, 10 Drawing Sheets

FIG.3

| GRA-DATION \ SF | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 0 |
| 3 | 1 | 1 | 1 | 0 | 0 | 0 | 0 | 0 | 0 | 0 | 0 | 0 |
| 4 | 1 | 1 | 1 | 1 | 0 | 0 | 0 | 0 | 0 | 0 | 0 | 0 |
| 5 | 1 | 1 | 1 | 1 | 1 | 0 | 0 | 0 | 0 | 0 | 0 | 0 |
| 6 | 1 | 1 | 1 | 1 | 1 | 1 | 0 | 0 | 0 | 0 | 0 | 0 |
| 7 | 1 | 1 | 1 | 1 | 1 | 1 | 1 | 0 | 0 | 0 | 0 | 0 |
| 8 | 1 | 1 | 1 | 1 | 1 | 1 | 1 | 1 | 0 | 0 | 0 | 0 |
| 9 | 1 | 1 | 1 | 1 | 1 | 1 | 1 | 1 | 1 | 0 | 0 | 0 |
| 10 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

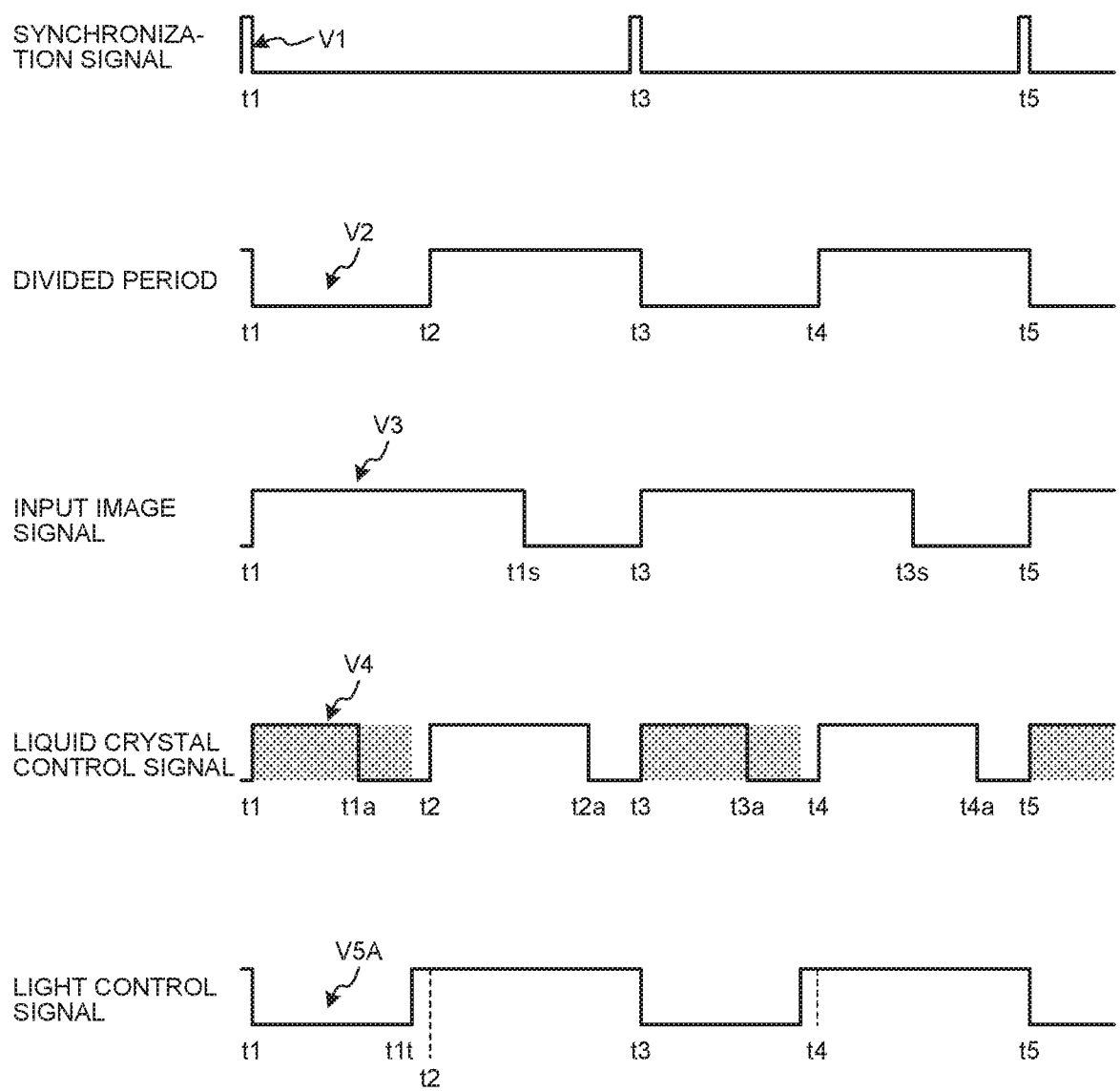

CONTROL DEVICE AND LIQUID CRYSTAL DISPLAY APPARATUS

CROSS-REFERENCE TO RELATED APPLICATIONS

This application claims priority from Japanese Application No. 2018-003682, filed on Jan. 12, 2018, the contents of which are incorporated by reference herein in its entirety.

BACKGROUND

1. Technical Field

The present disclosure relates to a control device and a liquid crystal display apparatus.

2. Description of the Related Art

When a moving image is displayed on a liquid crystal display apparatus, such as a projector; control, which is called black insertion, may be used. Black insertion is a technique where the frequency of an image signal is doubled, the frame period is time-divided into two periods, the image is displayed in one of the time-divided periods, and black display is performed in the other period. By this black display in the other period, switchover of images per frame period is able to be clarified.

Further, when a moving image is displayed on a liquid crystal display apparatus, a phenomenon, which is called tailing, may occur. Tailing is caused by alignment of a liquid crystal element in a direction different from an alignment direction that has been intended, due to a potential difference between adjacent pixels. That is, tailing is a phenomenon where a liquid crystal element belonging to a certain pixel is aligned due to a potential of a pixel adjacent thereto. When a liquid crystal element is aligned in an unintended alignment direction due to tailing, there is a risk that an unintended image will be displayed. For example, described in Japanese Patent No. 5217734 is reduction of tailing by detection of a moving pixel and voltage control therefor.

However, when a frame period is time-divided into two periods, like when black insertion is performed, tailing becomes prominent. Further, in a case where tailing is reduced as described in Japanese Patent No. 5217734, burden of control including the detection of a moving pixel will become large. Further, one may consider reduction of tailing by decreasing the voltage difference between adjacent pixels, but in a liquid crystal display apparatus where the distance between pixels is small, such as, for example, Liquid Crystal on Silicon (LCOS), there is a risk that tailing will be unable to be reduced adequately. Therefore, there is room for improvement in the technology for reduction of tailing.

SUMMARY

It is an object of the present disclosure to at least partially solve the problems in the conventional technology.

A control device that controls, based on an image signal for display of an image for each frame period, driving of a liquid crystal display apparatus is disclosed. The control device according to one embodiment of the present disclosure includes a period dividing unit that divides the frame period into a first period and a second period that is later than the first period, a signal calculating unit that calculates, based on the image signal, a first signal value and a second signal value for driving a liquid crystal element of the liquid crystal display apparatus, and a liquid crystal driving unit that drives the liquid crystal element with the first signal value in the first period, and drives the liquid crystal element with the second signal value in the second period. The signal calculating unit makes a quantity of light transmittable through a liquid crystal layer where the liquid crystal element is provided when the liquid crystal element is driven with the first signal value, less than a quantity of light transmittable through the liquid crystal layer when the liquid crystal element is driven with the second signal value, by calculating, based on the second signal value and a predetermined correction coefficient, the first signal value.

The above and other objects, features, advantages and technical and industrial significance of this disclosure will be better understood by reading the following detailed description of presently preferred embodiments of the invention, when considered in connection with the accompanying drawings.

BRIEF DESCRIPTION OF THE DRAWINGS

FIG. 3 is a diagram illustrating relations between gradation values and subframes, and pixel control;

FIG. 10 is an example of a time chart for control according to a modified example.

DETAILED DESCRIPTION OF THE PREFERRED EMBODIMENTS

Hereinafter, embodiments of the present disclosure will be described in detail, based on the drawings. The present disclosure is not limited by the embodiments described below.

(Overall Configuration of Liquid Crystal Display Apparatus)

Figure 1:
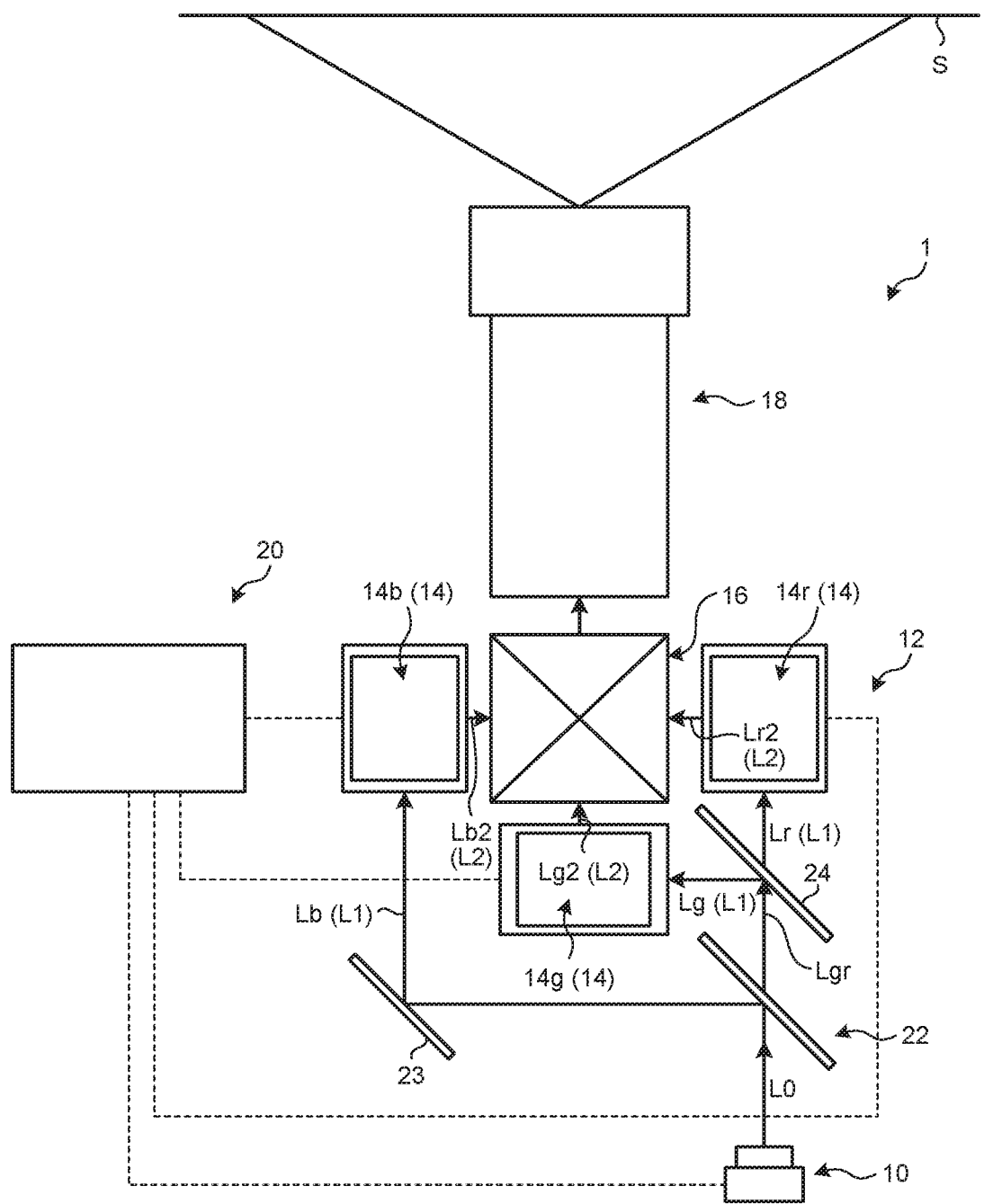
FIG. 1 is a diagram illustrating a schematic configuration of a liquid crystal display apparatus according to an embodiment of the present disclosure.

FIG. 1 is a diagram illustrating a schematic configuration of a liquid crystal display apparatus according to an embodiment of the present disclosure. As illustrated in FIG. 1, a liquid crystal display apparatus 1 according to the embodiment is a projection-type image display apparatus for projection of an image, which is, more particularly, a moving image, onto a screen S. The liquid crystal display apparatus 1 has a light emitting device 10, an illumination optical system 12, liquid crystal panels 14b, 14g, and 14r, a combination optical system 16, and a projection optical system 18.

The light emitting device 10 has a light source that generates light, and the light emitting device 10 emits incoming light L0, which is the light generated by the light source, to the illumination optical system 12. According to this embodiment, the light emitting device 10 has one light source in the example of FIG. 1 for descriptive purposes, but the light emitting device 10 may have any other optical device for generating the incoming light L0.

The illumination optical system 12 separates the incoming light L0 from the light emitting device 10, into first color light Lb, second color light Lg, and third color light Lr. Each of the first color light Lb, the second color light Lg, and the third color light Lr according to this embodiment is light of a color component from color light of three colors composing illumination light. Specifically, the first color light Lb is blue light, the second color light Lg is green light, and the third color light Lr is red light. When the first color light Lb, the second color light Lg, and the third color light Lr are described non-distinctively from one another, they will each be referred to as incoming light L1.

The illumination optical system 12 has optical elements 22, 23, and 24. The optical element 22 separates the incoming light L0 from the light emitting device 10 into the first color light Lb and mixed-color light Lgr. The optical element 22 supplies the separated first color light Lb to the optical element 23. The optical element 23 reflects the first color light Lb from the optical element 22, and supplies the reflected first color light Lb to the liquid crystal panel 14b. The mixed-color light Lgr is color light including the color components of both the second color light Lg and third color light Lr. The optical element 22 supplies the separated mixed-color light Lgr to the optical element 24. The optical element 24 separates the mixed-color light Lgr from the optical element 22, into the second color light Lg and the third color light Lr. The optical element 24 supplies the separated second color light Lg to the liquid crystal panel 14g, and supplies the separated third color light Lr to the liquid crystal panel 14r. The configuration of the illumination optical system 12 illustrated in FIG. 1 is just an example. The illumination optical system 12 may have any configuration as long as the illumination optical system 12 is configured to supply the first color light Lb, the second color light Lg, and the third color light Lr, respectively to the liquid crystal panels 14b, 14g, and 14r.

The liquid crystal panel 14b is a liquid crystal panel that modulates the first color light Lb from the optical element 23 with liquid crystal elements, and outputs outgoing light Lb2, which is the modulated first color light Lb. The liquid crystal panel 14g is a liquid crystal panel that modulates the second color light Lg from the optical element 24 with liquid crystal elements, and outputs outgoing light Lg2, which is the modulated second color light Lg. The liquid crystal panel 14r is a liquid crystal panel that modulates the third color light Lr from the optical element 24 with liquid crystal elements, and outputs outgoing light Lr2, which is the modulated third color light Lr. Hereinafter, when the liquid crystal panels 14b, 14g, and 14r are described non-distinctively from one another, they will each be referred to as a liquid crystal panel 14. Further, when the outgoing light Lb2, outgoing light Lg2, and outgoing light Lr2 are described non-distinctively from one another, they will each be referred to as outgoing light L2.

The liquid crystal panel 14 according to this embodiment is a reflective liquid crystal panel, and more particularly, is Liquid Crystal on Silicon (LCOS). However, the liquid crystal panel 14 is not necessarily a reflective liquid crystal panel, as long as the liquid crystal panel 14 modulates incoming light with liquid crystal elements and outputs the modulated light. For example, the liquid crystal panel 14 may be a transmissive liquid crystal panel. Further, in this embodiment, each of the liquid crystal panels 14b, 14g, and 14r emits single color outgoing light L2 (either the outgoing light Lb2, the outgoing light Lg2, or the outgoing light Lr2). However, one liquid crystal panel 14 may output outgoing light having a combination of the color components of the outgoing light Lb2, the outgoing light Lg2, and the outgoing light Lr2.

Figure 2:
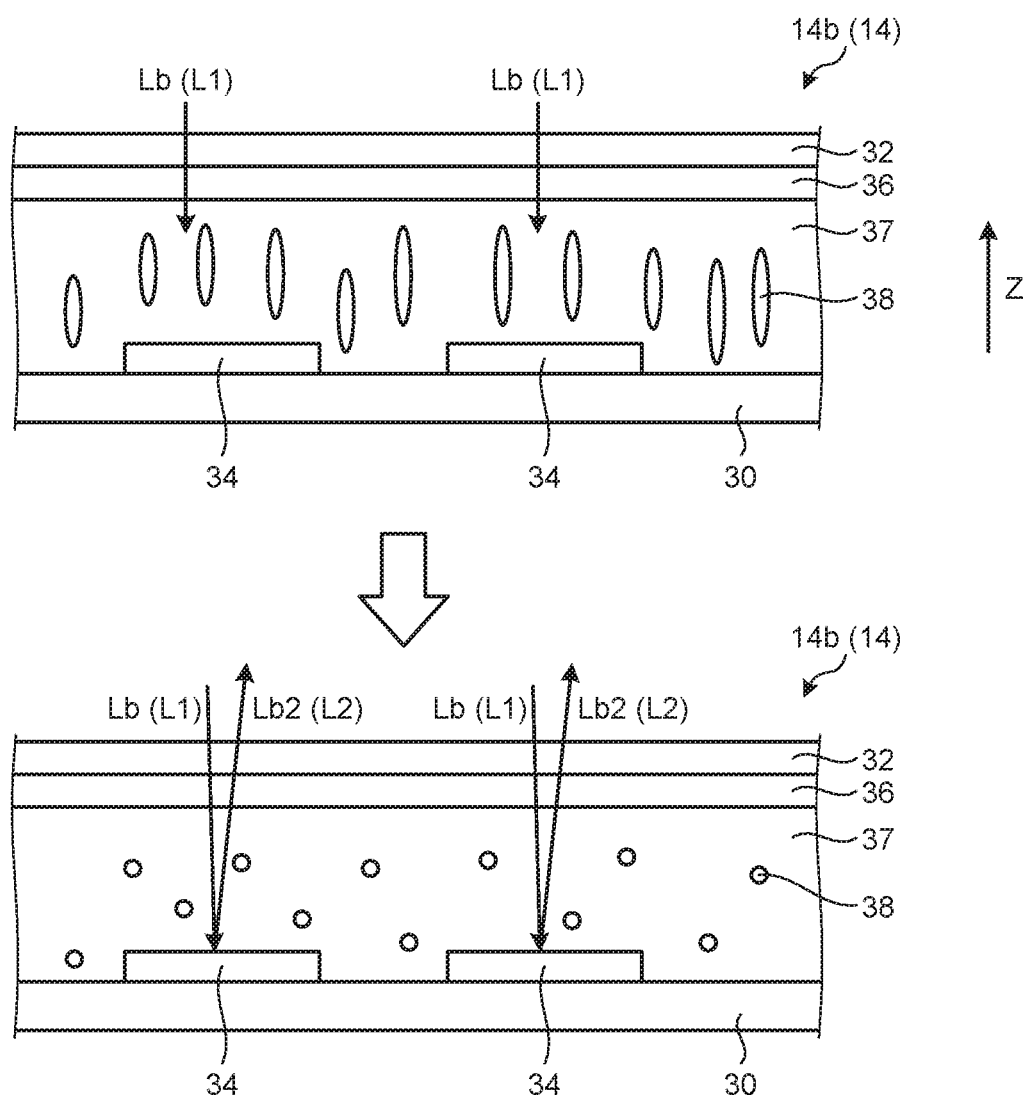
FIG. 2 is a sectional view of a liquid crystal panel according to the embodiment.

FIG. 2 is a sectional view of a liquid crystal panel according to the embodiment. FIG. 2 exemplifies a configuration of the liquid crystal panel 14b, but the liquid crystal panels 14g and 14r are configured similarly. As illustrated in FIG. 2, the liquid crystal panel 14b has substrates 30 and 32, pixel electrodes 34, a counter electrode 36, a liquid crystal layer 37, and liquid crystal elements 38. The liquid crystal panel 14b may have any other components, such as insulating layers provided between the respective layers, but description thereof will be omitted.

The substrate 30 is a semiconductor substrate of silicon or the like, a glass substrate, a resin substrate, or the like. The substrate 32 is a substrate provided oppositely to the substrate 30. The substrate 32 is arranged closer to a side where the first color light Lb is incident on, than the substrate 30. The substrate 32 is a semiconductor substrate of silicon or the like, a glass substrate, a resin substrate, or the like, and is formed of a material that transmits light therethrough.

The pixel electrodes 34 are provided on a surface of the substrate 30, the surface being toward the substrate 32. The plural pixel electrodes 34 are provided on the surface of the substrate 30, and are arranged in a two-dimensional matrix. Voltage is applied, under control by a control unit 20, between the pixel electrodes 34 and the counter electrode 36. In other words, a single pixel electrode 34 forms a single pixel. Further, the pixel electrodes 34 also serve as reflecting electrodes that reflect the first color light Lb. The pixel electrodes 34 are each formed of a member that is made of, for example, aluminum or silver, and that is able to reflect light. The counter electrode 36 is provided on a surface of the substrate 32, the surface being toward the substrate 30. There is one counter electrode 36 according to this embodiment, and this counter electrode 36 opposes the plural pixel electrodes 34. The counter electrode 36 is formed of a light transmissive and electrically conducting material, such as, for example, indium tin oxide (ITO), or indium zinc oxide (IZO).

The liquid crystal layer 37 corresponds to a space provided between the substrate 30 and the substrate 32, and has the liquid crystal elements 38 filled therein. As illustrated in the upper drawing of FIG. 2, the liquid crystal elements 38 are aligned in a single direction when voltage is not being applied between the pixel electrodes 34 and the counter electrode 36. According to this embodiment, when voltage is not being applied between the pixel electrodes 34 and the counter electrode 36, the liquid crystal elements 38 are aligned in a direction Z (a vertical direction). The direction Z is a direction, in which the substrate 30 and the substrate 32 are layered over each other. As illustrated in the lower drawing of FIG. 2, when voltage is applied between the pixel electrodes 34 and the counter electrode 36, the alignment direction of the liquid crystal elements 38 is changed due to an electric field generated by the pixel electrodes 34 and the counter electrode 36. According to this embodiment, the applied voltage has a constant value. Therefore, when the voltage is applied between the pixel electrodes 34 and the counter electrode 36, the liquid crystal elements 38 are aligned in a direction (a horizontal direction) orthogonal to the direction Z. However, the alignment directions of the liquid crystal elements 38 are not limited to these directions.

When the voltage is not being applied between the pixel electrodes 34 and the counter electrode 36, the liquid crystal elements 38 are aligned so as to not transmit the incident first color light Lb therethrough. In this case, as illustrated in the upper drawing of FIG. 2, even if the first color light Lb is incident on the liquid crystal panel 14b, the first color light Lb is blocked by the liquid crystal layer 37 and will not reach the pixel electrodes 34. Therefore, when the voltage is not being applied between the pixel electrodes 34 and the counter electrode 36, the liquid crystal panel 14b does not output the outgoing light Lb2. When none of the liquid crystal panels 14b, 14g, and 14r output the outgoing light L2, black display is achieved. Meanwhile, when the voltage is applied between the pixel electrodes 34 and the counter electrode 36, the liquid crystal elements 38 are aligned so as to transmit the incident first color light Lb therethrough. In this case, as illustrated in the lower drawing of FIG. 2, the first color light Lb incident on the liquid crystal panel 14b is transmitted through the liquid crystal layer 37, and reaches the pixel electrodes 34. The first color light Lb that has reached the pixel electrodes 34 is reflected by the pixel electrodes 34, is then transmitted through the liquid crystal layer 37 again, and then output as the outgoing light Lb2. As described, when the voltage is applied between the pixel electrodes 34 and the counter electrode 36, the liquid crystal panel 14b outputs the outgoing light Lb2.

With reference to FIG. 1 again, the combination optical system 16 combines the outgoing light Lb2 from the liquid crystal panel 14b, the outgoing light Lg2 from the liquid crystal panel 14g, and the outgoing light Lr2 from the liquid crystal panel 14r, to generate combined light. According to this embodiment, the combination optical system 16 includes a cross dichroic prism.

As illustrated in FIG. 1, the projection optical system 18 receives the combined light generated by the combination optical system 16, and projects, as an image, the combined light, onto the screen S.

The control unit 20 serving as a control device has an arithmetic device, that is, a central processing unit (CPU). The control unit 20 controls incidence of the incoming light L1 on the liquid crystal panel 14. In this embodiment, the control unit 20 switches on and off the incidence of the incoming light L1 on the liquid crystal panel 14 by controlling the incoming light L0 to the illumination optical system 12 from the light emitting device 10. However, the control unit 20 may control the incidence of the incoming light L1 on the liquid crystal panel 14 by, for example, driving a shutter or the like that blocks the incidence of the incoming light L1 on the liquid crystal panel 14, without directly controlling the light emitting device 10.

(Voltage Control by Control Unit)

The control unit 20 controls operation of the liquid crystal elements 38 of the liquid crystal panel 14 by controlling application of voltage to the pixel electrodes 34. The control unit 20 acquires an image signal for display of an image, from, for example, an external device. By controlling the application of voltage, based on the image signal, the control unit 20 controls quantity of light that is transmittable through the liquid crystal layer 37 of the liquid crystal panel 14, and causes the image to be displayed.

A quantity of light that is transmittable through the liquid crystal layer 37 will be referred to as a transmittable light quantity. A transmittable light quantity indicates an integrated value over a unit time period, of luminous flux that the liquid crystal layer 37 is able to transmit therethrough. A quantity of light that the liquid crystal layer 37 is able to transmit therethrough depends on a state of alignment of the liquid crystal elements 38, and the state of alignment depends on the voltage applied to the liquid crystal elements 38. Therefore, a transmittable light quantity can be said to be a value corresponding to an integrated value of voltage applied to the liquid crystal elements 38 over a duration of that application of voltage. For example, when voltage is not being applied to the liquid crystal elements 38, the liquid crystal layer 37 is aligned in a state where light is not transmitted therethrough. Therefore, in this case, even if the incoming light L1 is incident on the liquid crystal panel 14, the transmittable light quantity is zero. Meanwhile, when voltage is being applied to the liquid crystal elements 38, the liquid crystal layer 37 is aligned in a state where light is transmittable therethrough. Therefore, even if the incoming light L1 is not incident on the liquid crystal panel 14, the transmittable light quantity is not zero, and has a predetermined value. In other words, the transmittable light quantity can be said to be a value corresponding to an integrated value of quantity of alignment from a non-voltage-application state of the liquid crystal elements 38, over a duration of that alignment of the liquid crystal elements 38.

An image signal is a signal for display of an image for each frame period. A frame period is a period of one frame. One image is displayed in one frame period, and an updated image is displayed in a frame period subsequent thereto. Further, an image signal is a signal including information on gradation of pixels, for display of an image. As the quantity of light is increased, the gradation is visually recognized highly, and thus an image signal can also be said to include information indicating the quantity of the outgoing light L2 for reproduction of an image, the quantity of light being, in other words, the transmittable light quantity.

The control unit 20 according to the embodiment controls operation of the liquid crystal elements 38 by a digital driving method. In this digital driving method, the control unit 20 controls the liquid crystal elements 38 belonging to the respective pixels (the respective pixel electrodes 34) between two states, which are an on-state and an off-state. In other words, when voltage is applied to the pixel electrodes 34, the control unit 20 makes the value of the applied voltage constant. That is, when voltage is not applied, the control unit 20 makes the applied voltage 0 (the off-state) and when voltage is applied, the control unit 20 applies the voltage at a predetermined voltage value (the on-state). The on-state is a state where the liquid crystal panel 14 is able to output the outgoing light L2, and is, for example, a state where the transmissivity of the liquid crystal layer 37 is the highest. For example, the on-state is a state where display that is approximately white (white display) is achieved when white light is incident on the liquid crystal panel. Further, the off-state is a state where the liquid crystal panel 14 is unable to output the outgoing light L2, and is, for example, a state where the transmissivity of the liquid crystal layer 37 is the lowest. The off-state is a state where display that is approximately black (black display) is achieved when white light is incident on the liquid crystal panel.

Further, by controlling the quantities of the outgoing light L2 according to the time lengths of application of voltage to the pixel electrodes 34, the control unit 20 expresses gradation. When the duration of application of voltage is long, the duration of transmission of light through the liquid crystal layer 37 becomes long. Therefore, the longer the duration of application of voltage is, the larger the transmittable light quantity of the liquid crystal layer 37 in one frame period becomes. More specifically, the control unit 20 controls the time length of application of voltage by controlling the pixel electrode 34 to be in the on-state in some of subframes in one frame period, the number of the some of subframes corresponding to the gradation values of that pixel, and controlling the pixel electrode 34 to be in the off-state in the other subframes.

FIG. 3 illustrates an example of relations between gradation values and subframes, and pixel control. In FIG. 3, the columns correspond to subframes SF1, SF2, . . . , SF12 from left to right. Among these, the subframe SF1 is the head subframe of a frame period, and the subframe SF12 is the tail subframe of the frame period. Further, in FIG. 3, the gradation value is incremented by 1 from, 0 on the top line to the bottom line. The gradation value, "0", is the lowest (darkest) gradation value, and the gradation value, "12", is the highest (brightest) gradation value.

In the first embodiment, the control unit 20 selects subframes in order from the head of the frame period, the number of the subframes corresponding to the gradation value of the pixel, and controls the pixel to be in the on-state over the selected subframes. In FIG. 3, cells that are shaded and have the value, "1", indicate that the pixel is controlled to be in the on-state, and cells having the value, "0", indicate that the pixel is controlled to be in the off-state.

For example, if the gradation value of a certain pixel is "3", the control unit 20 selects three subframes (the subframes SF1, SF2, and SF3) starting from the head subframe SF1 of the frame period. The control unit 20 then controls the pixel to be in the on-state, over the selected subframes. Further, the control unit 20 controls the pixel to be in the off-state, over the other nine subframes (the subframes SF4 to SF12).

Further, for example, if the gradation value of a certain pixel is "12", the control unit 20 selects twelve subframes (the subframes SF1 to SF12), starting from the head subframe SF1 of the frame period. The control unit 20 then controls the pixel to be in the on-state, over the selected subframes. In this case, there are no subframes, over which the pixel is controlled to be in the off-state.

Further, for example, if the gradation value of a certain pixel is "0", the control unit 20 controls that pixel to be in the off-state over all of subframes (the subframes SF1 to SF12) in the one frame period. In this case, there are not subframes, over which the pixel is controlled to be in the on-state.

As described above, according to this embodiment, subframes, over which on and off control is performed, are assigned beforehand, for each gradation value. Further, when the gradation value is "0", the off-state of the pixel is maintained over the frame period, and when the gradation value is "12", the on-state of the pixel is maintained over the frame period. Since the gradation value, "0", and gradation value, "12", are able to be realized by control into the off-state and on-state over all of the subframes in the frame period, 12 is sufficient as the number of subframes in one frame period.

As described above, by controlling the time length of application of voltage while controlling the voltage to be applied to a pixel between the on-state and off-state, the control unit 20 controls the operation of the liquid crystal elements 38 and expresses the gradation value of each pixel. Hereinafter, a duration, over which a voltage is applied to a pixel, will be referred to as an application time period. An application time period corresponds to the number of subframes, over which the on-state is to be maintained.

(Voltage Control for Each Period by Control Unit)

Figure 4:
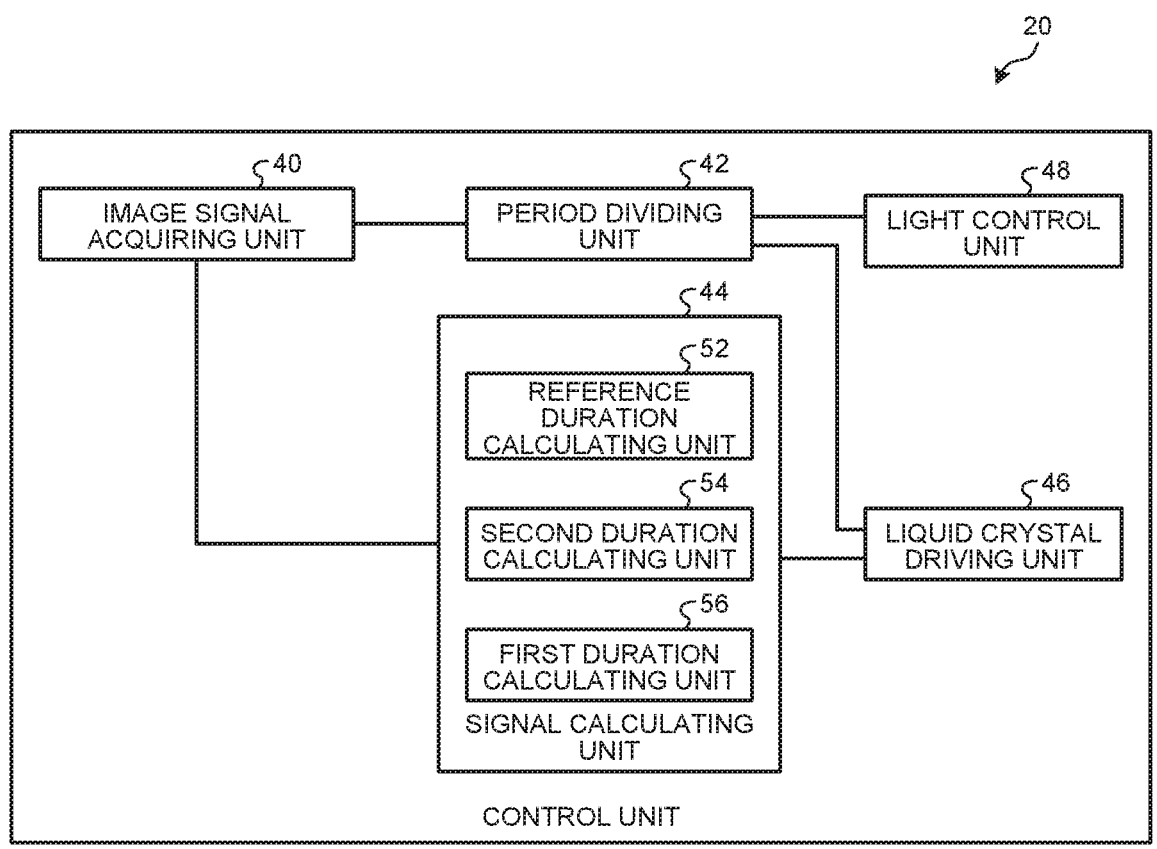
FIG. 4 is a block diagram of a control unit according to the embodiment.
Figure 5:
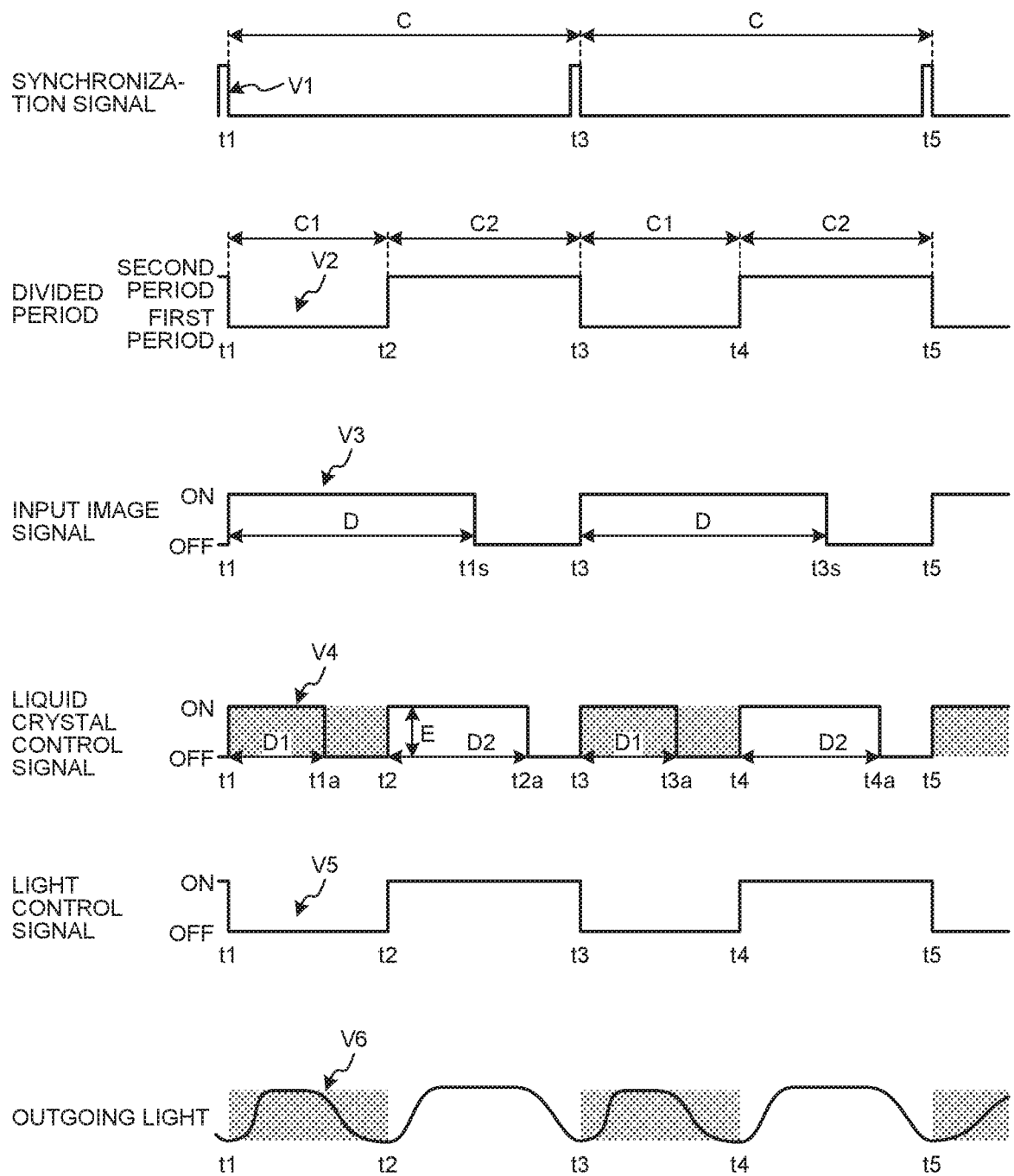
FIG. 5 is an example of a time chart of control by the control unit.

The control unit 20 divides a frame period C into a first period C1 and a second period C2, and individually controls application time periods of voltage in the first period C1 and the second period C2. Hereinafter, description will be made in more detail. FIG. 4 is a block diagram of the control unit according to the embodiment. FIG. 5 is an example of a time chart for control by the control unit. As illustrated in FIG. 4, the control unit 20 has an image signal acquiring unit 40, a period dividing unit 42, a signal calculating unit 44, a liquid crystal driving unit 46, and a light control unit 48. The image signal acquiring unit 40, the period dividing unit 42, the signal calculating unit 44, the liquid crystal driving unit 46, and the light control unit 48 are a program that has been stored in a storage unit of the control unit 20, the storage unit not being illustrated in the drawings, but they may be realized by dedicated hardware (circuits, and the like).

The image signal acquiring unit 40 acquires an image signal and a synchronization signal, from, for example, an external device. As described already, an image signal is a signal for display of an image per frame period C, and includes information on gradation of pixels. The synchronization signal is a clock signal indicating a frame period. In the example of FIG. 5, a line segment V1 represents the synchronization signal. As represented by the line segment V1 in FIG. 5, the synchronization signal is a pulse signal input for each frame period C. In the example of FIG. 5, the synchronization signal is input at times t1, t3, and t5. Therefore, the first frame period C is from the time t1 to the time t3, and the next frame period C is from the time t3 to the time t5.

With reference to FIG. 4 again, the period dividing unit 42 divide the frame period C into the first period C1 and the second period C2. The period dividing unit 42 determines a part of one frame period C as a first period C1, and the other part of the one frame period C as a second period C2, the other part being a time period later than the first period C1. More specifically, the period dividing unit 42 divides the frame period C into two time periods, the first one of the two time periods being the first period C1, the later one of the two time periods being the second period C2. The period dividing unit 42 makes lengths (time periods) of the first period C1 and the second period C2 in the one frame period C the same. However, the period dividing unit 42 may make lengths of the first period C1 and the second period C2 different from each other.

In the example of FIG. 5, as represented by a line segment V2, in the first frame period C, the first period C1 is a time period from the time t1 to a time t2, and the second period C2 is a time period from the time t2 to the time t3. In the next frame period C, the first period C1 is a time period from the time t3 to a time t4, and the second period C2 is a time period from the time t4 to the time t5.

Further, the signal calculating unit 44 illustrated in FIG. 4 calculates, based on an image signal acquired by the image signal acquiring unit 40, a reference duration D, a second duration D2, and a first duration D1. The signal calculating unit 44 has a reference duration calculating unit 52, a second duration calculating unit 54, and a first duration calculating unit 56.

Based on the image signal, the reference duration calculating unit 52 calculates the reference duration D for each frame period C. The reference duration D is a value that serves as a reference for calculation of the second duration D2. The reference duration calculating unit 52 calculates the reference duration D, which is an application time period of voltage, by which a pixel will have the graduation value indicated by the image signal. In other words, the reference duration D is an application time period of voltage, by which the transmittable light quantity becomes the light quantity specified by the image signal. Therefore, if a voltage is applied to a pixel over the reference duration D in one frame period C, the transmittable light quantity in that frame period C becomes a value that realizes the gradation value represented by the image signal. In addition, an integrated value of the value of voltage applied to a pixel over the reference duration D corresponds to the transmittable light quantity in the frame period C. Therefore, the reference duration D can be said to be a reference value that indicates the transmittable light quantity for achievement of a light quantity specified by the image signal.

The reference duration calculating unit 52 calculates the reference duration D for each pixel. For each frame period C, that is, every time an image signal is switched over to another image signal, the reference duration calculating unit 52 calculates the reference duration D. Therefore, the reference duration D has a different value for each pixel, and the value is updated for each frame period C.

A control signal by the control unit 20 in a case where it is assumed that a voltage has been applied to a pixel over a reference duration D will be referred to as an input image signal. A line segment V3 in FIG. 5 represents an example of the input image signal. As represented by the line segment V3, in one frame period C, the input image signal continues to be in the on-state (application of voltage) over the reference duration D, and reaches the off-state (stoppage of voltage) thereafter. That is, in the first frame period C, the input image signal is in the on-state from the time t1 to a time t1s, that is, over the reference duration D, and is in the off-state from the time t1s to the time t3. In the next frame period C, the input image signal is in the on-state from the time t3 to a time t3s, and is in the off-state from the time t3s to the time t5. Since the input image signal is the signal in the case where it is assumed that the voltage has been applied over the reference duration D, the input image signal does not represent a signal that is actually used in this embodiment.

The second duration calculating unit 54 illustrated in FIG. 4 calculates, based on the reference duration D, the second duration D2 serving as a second signal value. The second duration D2 is an application time period in the second period C2. Similarly to the reference duration D, the second duration D2 also has a different value for each pixel according to the image signal, and the value is updated for each frame period C. The second duration calculating unit 54 calculates the second duration D2 according to Equation (1) below.

$$D2 = (C2/C) \cdot D \quad (1)$$

That is, the second duration calculating unit 54 calculates the second duration D2, which is a value obtained by multiplication of a ratio of the second period C2 to the frame period C, by the reference duration D. The second duration D2 is shorter than the reference duration D. In this embodiment, since the second period C2 is half the frame period C (the frequency is twice), the second duration D2 is half the reference duration D. Since the second duration D2 is calculated as described above, the second duration D2 can be said to have a value indicating a light quantity worth the ratio of the second period C2 to the frame period C, the light quantity being from the transmittable light quantity for realization of the light quantity represented by the image signal. However, as long as the second duration calculating unit 54 calculates the second duration D2 based on the reference duration D, the second duration calculating unit 54 does not necessarily calculate the second duration D2 based on Equation (1). For example, the second duration calculating unit 54 may calculate, as the second duration D2, a value obtained by multiplication of the reference duration D by a predetermined coefficient that is less than 1.

Further, according to this embodiment, the value of voltage applied to a pixel is constant. Therefore, the second duration D2 serving as the second signal value can be said to have a value representing the transmittable light quantity in the second period C2.

The first duration calculating unit 56 illustrated in FIG. 4 calculates, based on the second duration D2, the first duration D1 serving as a first signal value. The first duration D1 is an application time period in the first period C1. That is, the first duration D1 serving as the first signal value is a value representing the transmittable light quantity in the first period C1. Similarly to the second duration D2, the first duration D1 also has a different value for each pixel according to the image signal, and the value of the first duration D1 is updated for each frame period C. The first duration calculating unit 56 calculates, based on the second duration D2 and a predetermined correction coefficient α, the first duration D1. More specifically, the first duration calculating unit 56 calculates the first duration D1 according to Equation (2) below.

$$D1 = \alpha \cdot D2 \quad (2)$$

That is, the first duration calculating unit 56 calculates, as the first duration D1, a value obtained by multiplication of the second duration D2 by the correction coefficient α. The value of the correction coefficient α does not differ for each frame period C and for each pixel. That is, the value of the correction coefficient α is constant and common to each frame period C and each pixel. The correction coefficient α is preferably equal to or greater than 0.3 and equal to or less than 0.8. Since the first duration D1 is a value based on this correction coefficient α, the first duration D1 is proportional to the second duration D2, and smaller than the second duration D2. Therefore, the transmittable light quantity when voltage is applied over the first duration D1 in the first period C1 belonging to a certain frame period C is less than the transmittable light quantity when voltage is applied over the second duration D2 in the second period C2 belonging to the same frame period C.

Based on the calculated first duration D1 and second duration D2, the liquid crystal driving unit 46 illustrated in FIG. 4 drives the liquid crystal element 38 by controlling the state of application of voltage. The liquid crystal driving unit 46 drives the liquid crystal element 38 over the first duration D1 in the first period C1, and drives the liquid crystal element 38 over the second duration D2 in the second period C2. That is, the liquid crystal driving unit 46 applies voltage to the pixel electrode 34 over the first duration D1 in the first period C1, and stops the application of voltage after elapse of the first duration D1. The liquid crystal driving unit 46 then applies voltage to the pixel electrode 34 over the second duration D2 in the second period C2. The first duration D1 and the second duration D2 are calculated, according to the image signal, for each pixel and for each frame period C. Therefore, the liquid crystal driving unit 46 controls the state of application of voltage for each pixel and for each frame period C. The first duration D1 has been set to a value smaller than that of the second duration D2. Similarly, even in a case where the second duration D2 accounts for the entire period of the second period C2 (voltage is applied over the entire second period C2), a time period, over which voltage is stopped, is kept after the first duration D1 in the first period C1.

By use of FIG. 5, control of the state of application of voltage by the liquid crystal driving unit 46 will now be described. A signal for the control of the state of application by the liquid crystal driving unit 46 will be referred to as a liquid crystal control signal. A line segment V4 in FIG. 5 represents an example of the liquid crystal control signal. As represented by the line segment V4, the liquid crystal driving unit 46 applies voltage to the pixel electrode 34 by maintaining the on-state from the time t1 to a time t1a in the first period C1 belonging to the first frame period C. The liquid crystal driving unit 46 then stops the application of voltage by maintaining the off-state from the time t1a to the time t2. The first duration D1 corresponds to a time period from the time t1 to the time t1a. Therefore, the liquid crystal element 38 in the vicinity of that pixel electrode 34 is aligned in a state (a direction) where light is transmittable therethrough from the time t1 to the time t1a, and is aligned in a state (a direction) where light is not transmittable therethrough from the time t1a to the time t2.

Further, the liquid crystal driving unit 46 applies voltage to the pixel electrode 34 by maintaining the on-state from the time t2 to a time t2a in the second period C2 belonging to the first frame period C. The liquid crystal driving unit 46 then stops the application of voltage by maintaining the off-state from the time t2a to the time t3. The second duration D2 corresponds to a time period from the time t2 to the time t2a. Therefore, the liquid crystal element 38 in the vicinity of that pixel electrode 34 is aligned in the state where light is transmittable therethrough from the time t2 to the time t2a, and is aligned in the state where light is not transmittable therethrough from the time t2a to the time t3. In this case, the transmittable light quantity over the first duration D1 is an integrated value of the applied voltage value E over the first duration D1. Similarly, the transmittable light quantity over the second duration D2 is an integrated value of the applied voltage value E over the second duration D2. The transmittable light quantity over the second duration D2 is larger than the transmittable light quantity over the first duration D1.

Similarly, the liquid crystal driving unit 46 maintains the on-state from the time t3 to a time t3a (over the first duration D1), and maintains the off-state from the time t3a to the time t4, in the first period C1 belonging to the next frame period C. Further, the liquid crystal driving unit 46 maintains the on-state from the time t4 to a time t4a (over the second duration D2), and maintains the off-state from the time t4a to the time t5, in the second period C2.

Further, the light control unit 48 illustrated in FIG. 4 controls incidence of the incoming light L1 on the liquid crystal panel 14. The light control unit 48 stops incidence of the incoming light L1 on the liquid crystal panel 14 in the first period C1, and lets the incoming light L1 be incident on the liquid crystal panel 14 in the second period C2. The light control unit 48 makes the intensity of the incoming light L1 constant when letting the incoming light L1 be incident on the liquid crystal panel 14.

By use of FIG. 5, control of the incoming light L1 by the light control unit 48 will now be described. A signal for the control of the incoming light L1 by the light control unit 48 will be referred to as a light control signal. A line segment V5 in FIG. 5 represents an example of the light control signal. As represented by the line segment V5, the light control unit 48 stops the incoming light L1 from being incident on the liquid crystal panel 14 by maintaining the off-state from the time t1 to the time t2, that is, over the first period C1. The light control unit 48 then lets the incoming light L1 be incident on the liquid crystal panel 14 by maintaining the on-state from the time t2 to the time t3, that is, over the second period C2. Similarly, the light control unit 48 stops the incoming light L1 from being incident on the liquid crystal panel 14 from the time t3 to the time t4, and lets the incoming light L1 be incident on the liquid crystal panel 14 from the time t4 to the time t5.

Since the incoming light L1 is controlled as described above, in the first period C1, regardless of the state of the liquid crystal elements 38, the outgoing light L2 is not output, and the liquid crystal panel 14 performs black display (the gray color on the line segment V4 in FIG. 5). Meanwhile, in the second period C2, the outgoing light L2 corresponding to the transmittable light quantity worth the second duration D2 is output. Therefore, the liquid crystal panel 14 repeatedly performs the black display in the first period C1, and the display for the light quantity worth the second duration D2 in the second period C2.

Figure 6:
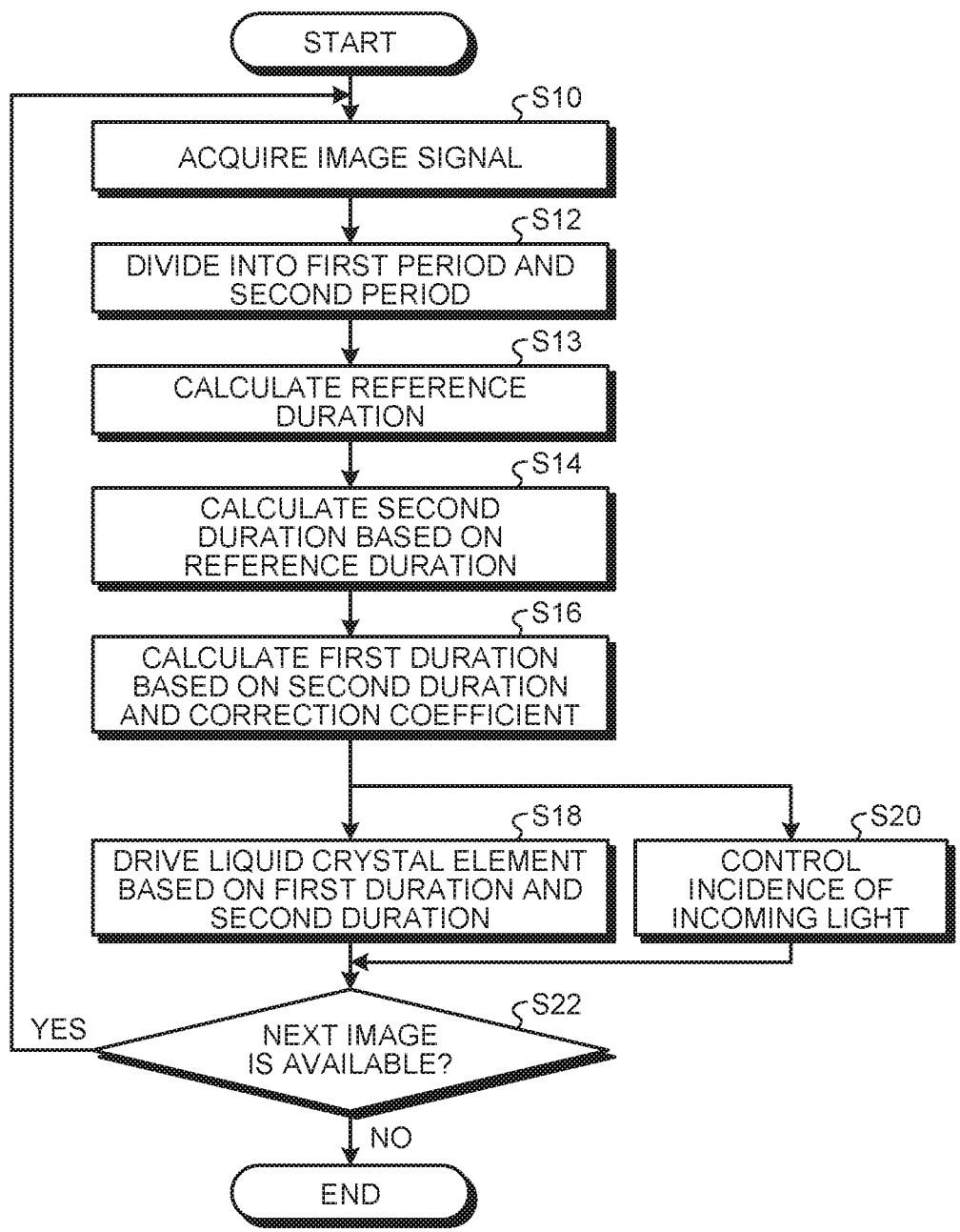
FIG. 6 is a flow chart illustrating a flow of the control by the control unit.

The control unit 20 controls the application of voltage to the pixel electrodes 34 and the incidence of the incoming light L1 on the liquid crystal panel 14, as described above. Next, a flow of control by the control unit 20 will be described based on a flow chart. FIG. 6 is a flow chart illustrating the flow of control by the control unit. As illustrated in FIG. 6, the control unit 20 acquires an image signal through the image signal acquiring unit 40 (Step S10), and divides a frame period C into a first period C1 and a second period C2 through the period dividing unit 42 (Step S12). The period dividing unit 42 does not necessarily perform the division into the first period C1 and the second period C2 every time an image signal is acquired, and may perform division into the first period C1 and the second period C2 beforehand upon start of the control.

Thereafter, the control unit 20 calculates a reference duration D through the reference duration calculating unit 52 (Step S13), and calculates, based on the reference duration D, a second duration D2 through the second duration calculating unit 54 (Step S14). After calculating the second duration D2, the control unit 20 calculates, based on the second duration D2 and the correction coefficient α, a first duration D1 through the first duration calculating unit 56 (Step S16). For each pixel, the control unit 20 calculates a reference duration D, a second duration D2, and a first duration D1. After calculating the first duration D1, the control unit 20 drives the liquid crystal element 38 through the liquid crystal driving unit 46 controlling, based on the first duration D1 and second duration D2, application of voltage to the pixel electrode 34 (Step S18). Further, the control unit 20 controls incidence of the incoming light L1 on the liquid crystal panel 14, through the light control unit 48 (Step S20). The control unit 20 performs the control of application of voltage, for each pixel electrode 34, but performs the control of incidence of the incoming light L1 commonly to all of the pixels.

After Step S18 and Step S20, the control unit 20 determines whether a next image is available, that is, whether a next image signal is available (Step S22), and if a next image is available (Step S22; Yes), the control unit 20 returns to Step S10 and repeats the control. If a next image is not available (Step S22; No), the control unit 20 ends the control.

When a moving image is displayed, that is, consecutive images are displayed, on a liquid crystal display device, a phenomenon called tailing may occur. Tailing is a phenomenon where a liquid crystal element in the vicinity of a certain pixel is aligned in direction that has not been intended, due to the electric field of the adjacent pixel. When tailing occurs, since the liquid crystal element will not be aligned in the intended direction, there is a risk that a desired image will be unable to be displayed. For example, the number of pixels is able to be increased in LCOS, but since the distance between the pixel electrodes becomes short, susceptibility to the adjacent electric field is increased, and there is a risk that tailing will become prominent. Further, in a case where a liquid crystal element is aligned in the vertical direction (the direction Z in FIG. 2) when voltage is not being applied, and the liquid crystal element is aligned in the horizontal direction when voltage is being applied, there is a risk that a horizontal electric field will be exerted and tailing will become prominent.

In contrast, the control unit 20 according to the embodiment divides a frame period C into a first period C1 and a second period C2. The control unit 20 then drives the liquid crystal element 38 by applying a voltage to the pixel over the first duration D1 in the first period C1, and stops the application of the voltage after elapse of the first duration D1. The control unit 20 then drives the liquid crystal element 38 over the second duration D2 in the second period C2. Before displaying the image in the second period C2, the control unit 20 drives the liquid crystal element 38 over the first duration D1 in the first period C1 in advance, and stops driving the liquid crystal element 38 after the first duration D1. Further, by setting the first duration D1 to be shorter than the second duration D2, the control unit 20 keeps a time period for stoppage of the driving of the liquid crystal element 38. Therefore, by this control, before the second period C2 starts, alignment of the liquid crystal elements 38 in the vicinity of all of the pixels is returned over a sufficient time period, and the alignment of the liquid crystal elements 38 is able to be returned adequately to the state where voltage is not applied. Therefore, this control enables tailing to be adequately reduced.

Further, the control unit 20 stops the application of voltage only in a part of the first period C1, instead of stopping the application of voltage over the entire first period C1. Furthermore, the control unit 20 applies voltage during the first duration D1. Thereby, delay in driving of the liquid crystal elements 38 in the second period C2 is able to be prevented. Further, since the control unit 20 stops the incidence of the incoming light L1 in the first period C1, an image is prevented from being visually recognized in the first period C1 for prevention of tailing. Therefore, this control enables a moving image to be displayed appropriately, while enabling tailing to be prevented.

A line segment V6 in FIG. 5 represents an example of behavior of outgoing light when voltage is controlled as represented by the line segment V4. The line segment V6 in FIG. 5 represents the alignment state of the liquid crystal element 38, and the gray portions each represent a state where the incoming light L1 is not incident. Therefore, at the gray portions on the line segment V6, even if the liquid crystal element 38 is in an alignment state where light is transmittable therethrough, in actuality, the outgoing light L2 is not output and black display is achieved. As represented by the line segment V6 in FIG. 5, the liquid crystal element 38 is brought into the state where light is transmittable therethrough by gradually being aligned in the horizontal direction by the application of voltage at the time t1. The alignment of the liquid crystal element 38 is then gradually returned to be in the vertical direction when the voltage is stopped at the time t1a, and is in a state where the alignment has sufficiently returned to be in the vertical direction at the time t2. However, from the time t1 to the time t2, since the incoming light L1 is being blocked, black display is performed without output of the outgoing light L2. Thereafter, when voltage is applied at the time t2, the liquid crystal element 38 is brought into the state where light is transmittable therethrough without much delay. Further, the incoming light L1 is caused to be incident, from the time t2. Therefore, in the second period C2 from the time t2, the outgoing light L2 is appropriately output. It is thus understood that when the application of voltage is controlled according to the embodiment, in the second period C2, tailing is prevented and the outgoing light L2 is able to be output appropriately.

According to this embodiment, the control unit 20 controls the transmittable light quantity by changing the application time period while maintaining the voltage applied to the pixel constant. However, the control unit 20 may control the light quantity by changing the voltage applied while maintaining the application time period constant. In this case, the reference duration calculating unit 52 calculates, instead of the reference duration D, a reference voltage, which is a reference value indicating the light quantity for obtainment of the light quantity specified by the image signal. The reference voltage can be said to have a voltage value for realization of the transmittable light quantity for obtainment of the light quantity specified by the image signal when the application time period is constant. Further, in this case, the second duration calculating unit 54 calculates the second signal value as a second voltage, instead of the second duration D2. A method for calculation of the second voltage is the same as the method for calculation of the second duration D2, except for replacement of the reference duration D by the reference voltage. Further, the first duration calculating unit 56 calculates the first signal value as a first voltage, instead of the first duration D1. A method for calculation of the first voltage is the same as the method for calculation of the first duration D1, except for replacement of the second duration D2 by the second voltage. Further, the control unit 20 may change both the application time period and the applied voltage.

When the voltage to be applied is controlled instead of the application time period, the first voltage that is the first signal value is also lower than the second voltage that is the second signal value. Therefore, when the voltage is controlled as described above, the alignment is able to be returned before the second period C2 starts by reduction of the alignment of the liquid crystal elements 38 in the first period. Therefore, even when the applied voltage is controlled, tailing is able to be prevented similarly.

As described above, the control unit 20 according to the embodiment controls, based on an image signal for display of an image for each frame period C, driving of the liquid crystal display apparatus 1. The control unit 20 has the period dividing unit 42, the signal calculating unit 44, and the liquid crystal driving unit 46. The period dividing unit 42 divides a frame period C into a first period C1 and a second period C2, which is later than the first period C1. Based on the image signal, the signal calculating unit 44 calculates a first signal value (the first duration D1 according to this embodiment) and a second signal value (the second duration D2 according to this embodiment) for driving the liquid crystal element 38 of the liquid crystal display apparatus 1. The liquid crystal driving unit 46 drives the liquid crystal element 38 with the first signal value in the first period C1, and drives the liquid crystal element 38 with the second signal value in the second period C2. Further, by calculating the first signal value based on the second signal value and predetermined correction coefficient α, the signal calculating unit 44 makes the quantity of light transmittable (the transmittable light quantity) through the liquid crystal layer 37 when the liquid crystal element 38 is driven with the first signal value, lower than the quantity of light transmittable through the liquid crystal layer 37 when the liquid crystal element 38 is driven with the second signal value.

This control unit 20 drives the liquid crystal elements 38 in the first period C1, such that the transmittable light quantity becomes less than that in the second period C2. Therefore, before the second period C2 for display of the image, the alignment state of the liquid crystal elements 38 is able to be canceled sufficiently. Therefore, the control unit 20 enables tailing to be adequately reduced when an image is displayed. Further, the control unit 20 calculates, based on the second signal value and the correction coefficient α, the first signal value. Therefore, the control unit 20 is able to change the first signal value for reduction of tailing, for each value of the second signal value, and is able to set the first signal value to an appropriate value for each pixel and each frame.

In addition, the control unit 20 further has the light control unit 48 that controls the light (the incoming light L1) to be emitted to the liquid crystal elements 38. The light control unit 48 blocks the incoming light L1 in the first period C1, and emits the incoming light L1 to the liquid crystal elements 38 in the second period C2. The control unit 20 prevents an unnecessary image from being visually recognized by blocking the incoming light L1 in the first period C1, which is a time period for reduction of tailing. By letting the incoming light L1 be incident in the second period C2, the control unit 20 is able to cause an image to be appropriately displayed, the image being in a state where tailing has been reduced. However, the control unit 20 may cause the incoming light L1 to be emitted in the first period C1. In this case, the control unit 20 preferably makes the amount of irradiation with the incoming light L1 in the first period C1 less than the amount of irradiation with the incoming light L1 in the second period C2. The control unit 20 may make the amount of irradiation with the incoming light L1 in the first period C1, for example, about 10% of the amount of irradiation with the incoming light L1 in the second period C2.

Further, the signal calculating unit 44 calculates the first signal value, such that the integrated value in the first period C1 (the transmittable light quantity) of the value of voltage applied to the liquid crystal element 38 over the duration of application of voltage (the application time period) becomes less than the integrated value in the second period C2 (the transmittable light quantity). This signal calculating unit 44 makes the integrated value of the value of voltage over the duration of application of voltage in the second period C2 less than the integrated value in the first period C1. Thereby, by moderation of the alignment state in the first period C1, tailing is able to be reduced adequately. Further, by the liquid crystal elements 38 being aligned less in the first period C1, the liquid crystal elements 38 are prevented from being delayed in response in the second period C2, and a more appropriate image is able to be displayed.

Further, the signal calculating unit 44 calculates the first signal value as the first duration D1, over which voltage is applied in the first period C1, and calculates the second signal value, as the second duration D2, over which voltage is applied in the second period C2. The liquid crystal driving unit 46 then applies voltage to the liquid crystal element 38 over the first duration D1 in the first period C1, and applies voltage to the liquid crystal element 38 over the second duration D2 in the second period C2. By setting the first duration D1 shorter than the second duration D2, the control unit 20 enables the alignment state of the liquid crystal element 38 to be sufficiently canceled before the second period C2 starts. Therefore, the control unit 20 enables tailing to be adequately reduced when an image is displayed.

Further, from the start of the first period C1 until the first duration D1 elapses, the liquid crystal driving unit 46 applies voltage, and after the elapse of the first duration D1 up to the start of the second period C2, the liquid crystal driving unit 46 stops the application of voltage. By stopping the application of voltage after the elapse of the first duration D1 up to the start of the second period C2, the control unit 20 enables the alignment state of the liquid crystal element 38 to be sufficiently canceled in this time period, and thus enables tailing to be adequately reduced.

Further, the signal calculating unit 44 calculates, as the first signal value, a value obtained by multiplying the second signal value by the correction coefficient α, and this correction coefficient α is equal to or greater than 0.3 and equal to or less than 0.8. The control unit 20 is able to change the first signal value for reduction of tailing, for each value of the second signal value, and is able to set the first signal value to an appropriate value for each pixel and frame. Further, by the correction coefficient α being made to be in this numerical range, insufficient reduction of tailing due to the first signal value becoming too large, or response of the liquid crystal element 38 in the second period being too late due to the first signal value becoming too small, is able to be prevented.

Further, the liquid crystal display apparatus 1 according to the embodiment has the control unit 20, and the liquid crystal panel 14 having the liquid crystal elements 38. By the control by the control unit 20, this liquid crystal display apparatus 1 enables adequate reduction of tailing.

Further, the liquid crystal panel 14 is a reflective liquid crystal panel. Through the control by the control unit 20, this liquid crystal display apparatus 1 enables adequate reduction of tailing for the reflective liquid crystal panel 14.

Comparative Examples

Figure 7:
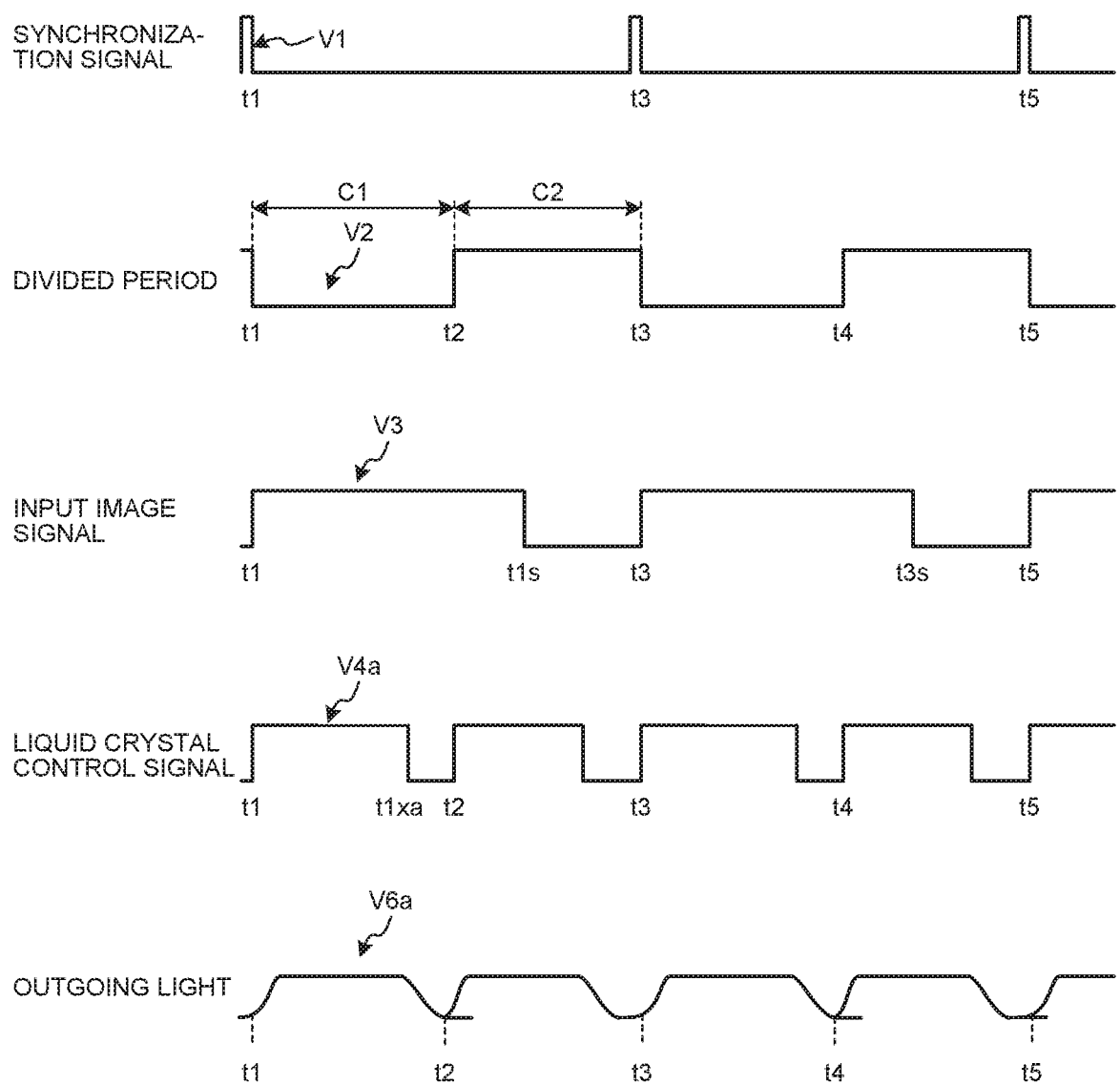
FIG. 7 is an example of a time chart for control according to a first comparative example.

Comparative examples will now be described. FIG. 7 is an example of a time chart for control according to a first comparative example. The first comparative example represents an example where division into a first period C1 and a second period C2 is performed, and application time periods in the first period C1 and the second period C2 are made the same without the application time period in the first period C1 being set smaller than the application time period in the second period C2. In this case, as represented by a line segment V4a, in the first period C1, the on-state is maintained from the time t1 to a time t1xa, and the off-state is maintained from the time t1xa to the time t2. Since the duration of the off-state from the time t1xa to the time t2 is short in this case, the alignment of the liquid crystal element 38 will not be returned sufficiently before the second period C2. Therefore, as represented by a line segment V6a in FIG. 7, the outgoing light is not appropriately output at the time t2, and tailing is caused.

Figure 8:
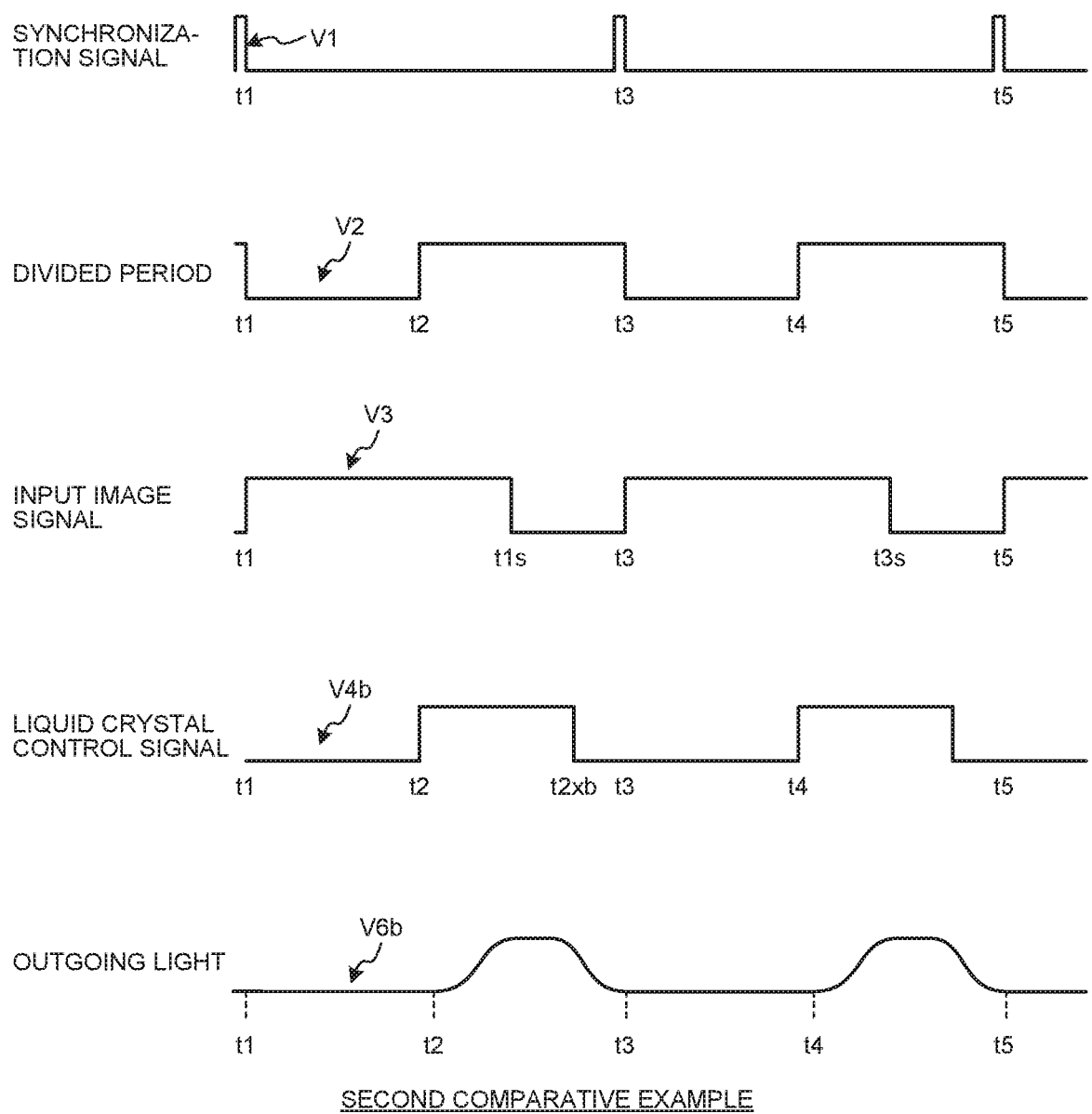
FIG. 8 is an example of a time chart for control according to a second comparative example.

FIG. 8 is an example of a time chart for control according to a second comparative example. The second comparative example represents an example where division into the first period C1 and the second period C2 is performed, but voltage is not applied in the first period C1. In this case, as represented by a line segment V4b, in the entire first period C1, that is, from the time t1 to the time t2, the off-state is maintained. In the second period C2, from the time t2 to a time t2xb, the on-state is maintained. In this case, as represented by a line segment V6b, since the off-state is maintained throughout the first period C1, response of the liquid crystal element 38 is delayed in the second period C2, and output of the outgoing light is thus delayed.

In contrast to these comparative examples, according to the embodiment of the present disclosure, since, in the first period C1, the on-state is maintained over the first duration D1 that is shorter than the second duration D2 in the second period C2, tailing is able to be reduced and delay of response of the liquid crystal element 38 in the second period C2 is able to be reduced.

Modified Examples

Figure 9:
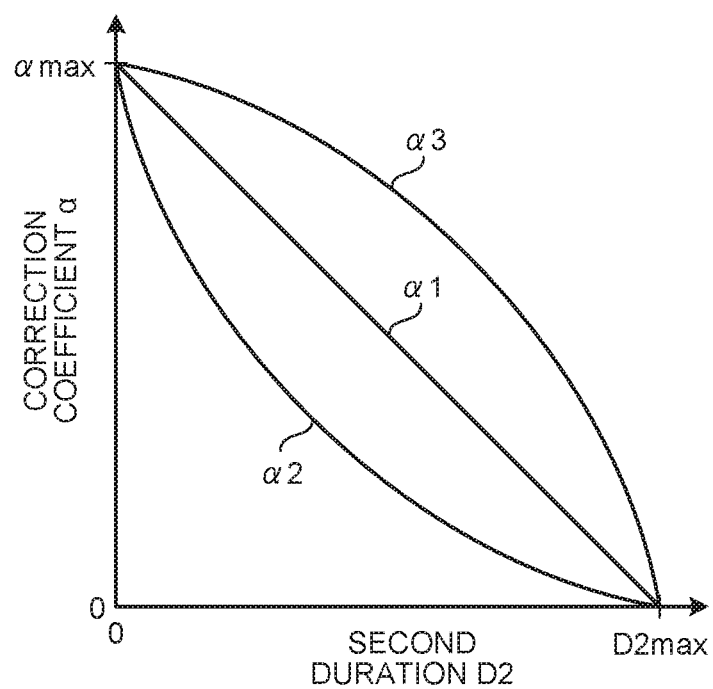
FIG. 9 is a diagram for explanation of a correction coefficient according to a modified example.

Next, modified examples of the embodiment of the present disclosure will now be described. FIG. 9 is a diagram for explanation of a correction coefficient according to a modified example. According to the embodiment of the present disclosure, the correction coefficient α for the calculation of the first duration D1 has a constant value. However, the control unit 20 may make the value of the correction coefficient α not constant. For example, the control unit 20 may change the value of the correction coefficient α according to the magnitude of the second duration D2 (the second signal value). More specifically, the control unit 20 may decrease the value of the correction coefficient α as the second duration D2 (the second signal value) is increased. In this case, for example, when the second duration D2 is 0, the correction coefficient α has the maximum value $α_{max}$, and when the second duration D2 has the maximum value $D2_{max}$, the correction coefficient α is 0. As represented by a line segment α1 in FIG. 9, the value of the correction coefficient α may linearly decrease as the second duration D2 is increased. Further, as represented by a line segment α2 in FIG. 9, the value of the correction coefficient α may decrease in a depressed, curved line as the second duration D2 is increased. Furthermore, as represented by a line segment α3 in FIG. 9, the value of the correction coefficient α may decrease in a protruding, curved line as the second duration D2 is increased. When the second duration D2 (the second signal value) is increased, since the on-state becomes longer, there is a risk that tailing will become prominent. Therefore, by decreasing the correction coefficient α as the second duration D2 is increased, the control unit 20 decreases the first duration D1 and increases the duration, over which the voltage application is stopped. Thereby, when there is a risk that tailing will be prominent, by sufficient stoppage of the application of voltage, alignment of the liquid crystal element 38 is adequately returned, and tailing is reduced more effectively. Moreover, by increase of the correction coefficient α as the second duration D2 (the second signal value) is decreased, when the second duration D2 is short and tailing will not become prominent, the duration of stoppage of voltage application is able to be reduced and thus responsiveness of the liquid crystal element 38 is able to be increased.

Further, according to the embodiment of the present invention, the liquid crystal panels 14b, 14g, and 14r output the outgoing light Lb2, outgoing light Lg2, and outgoing light Lr2 having different colors from one another. The control unit 20 calculates the first duration D1 and the second duration D2, for each of the liquid crystal panels 14b, 14g, and 14r. However, the control unit 20 may make the correction coefficients α the same for any of the liquid crystal panels 14b, 14g, and 14r, for corresponding pixels among the liquid crystal panels 14b, 14g, and 14r, that is, for pixels composing the same spot in the image.

Further, according to the embodiment of the present disclosure, the control unit 20 stops the incidence of the incoming light L1 over the entire first period C1. However, the control unit 20 may cause the incoming light L1 to be incident in a part of the first period C1. FIG. 10 is an example of a time chart for control according to a modified example. As represented by a line segment V5A in FIG. 10, for example, in the first period C1, the control unit 20 may stop incidence of the incoming light L1 from the time t1 to a time t1t, and cause the incoming light L1 to be incident from the time t1t to the time t2.

The present disclosure enables reduction of tailing.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device that controls, based on an image signal for display of an image by frame period, driving of a liquid crystal display apparatus, the control device comprising:
a period dividing unit that divides the frame period into a first period and a second period that is later than the first period;
a signal calculating unit that calculates, based on the image signal, a first signal value and a second signal value for driving a liquid crystal element of the liquid crystal display apparatus; and
a liquid crystal driving unit that drives the liquid crystal element with the first signal value in the first period, and drives the liquid crystal element with the second signal value in the second period, wherein
the signal calculating unit makes a quantity of light transmittable through a liquid crystal layer where the liquid crystal element is provided when the liquid crystal element is driven with the first signal value, less than a quantity of light transmittable through the liquid crystal layer when the liquid crystal element is driven with the second signal value, by calculating the second signal value such that a light quantity obtained by multiplication of the ratio of the second period to the frame period by a light quantity specified by the image signal is a quantity of light transmittable through the liquid crystal layer, and calculating, based on the second signal value and a predetermined correction coefficient, the first signal value, when an intensity of light incident on the liquid crystal element is constant.

2. The control device according to claim 1, further comprising:
a light control unit that controls light to be emitted to the liquid crystal element, wherein
the light control unit blocks light to be emitted to the liquid crystal element in the first period, and causes light to be emitted to the liquid crystal element in the second period.

3. The control device according to claim 1, wherein the signal calculating unit calculates the first signal value, such that an integrated value in the first period, of value of voltage applied to the liquid crystal element over a duration of application of the voltage becomes less than the integrated value in the second period.

4. The control device according to claim 3, wherein
the signal calculating unit calculates, as a first duration of application of the voltage in the first period, the first signal value, and calculates, as a second duration of application of the voltage in the second period, the second signal value, and the liquid crystal driving unit applies the voltage to the liquid crystal element over the first duration in the first period, and applies the voltage to the liquid crystal element over the second duration in the second period.

5. The control device according to claim 4, wherein the liquid crystal driving unit applies the voltage from start of the first period until the first duration elapses, and stops application of the voltage after the elapse of the first duration up to start of the second period.

6. A liquid crystal display apparatus, comprising:
the control device according to claim 1; and
a liquid crystal panel having the liquid crystal element.

* * * * *